364-516 340 SSS SR
12/13/77 XR 4,063,073

United States Patent [19]

Strayer

[11] 4,063,073

[45] Dec. 13, 1977

[54] COMPUTER SYSTEM TO PREVENT COLLISION BETWEEN MOVING OBJECTS SUCH AS AIRCRAFT MOVING FROM ONE SECTOR TO ANOTHER

[76] Inventor: Larry G. Strayer, 10300 Strafford Lane, Chatsworth, Calif. 91311

[21] Appl. No.: 528,435

[22] Filed: Nov. 29, 1974

[51] Int. Cl.[2] .......... G06F 15/50
[52] U.S. Cl. .......... 364/439; 364/516
[58] Field of Search .......... 235/150.23

[56] References Cited

U.S. PATENT DOCUMENTS

| | | | |
|---|---|---|---|
| 3,582,626 | 6/1971 | Stansbury | 235/150.23 X |
| 3,808,598 | 4/1974 | Carter | 235/150.23 X |

*Primary Examiner*—R. Stephen Dildine, Jr.

[57] ABSTRACT

A method and system of preventing collisions between aircraft comprising defining an imaginary airspace around the center of each aircraft, the airspace having a given radius (R) and height (H), and moving with and at the same velocity as the aircraft. An imaginary airspace having zero velocity is defined around objects of terrain and the parameters of each defined airspace are updated as the corresponding aircraft travels. The parameters of each aircraft defined airspace is compared one at a time with the parameters of all other defined airspaces within a discrete altitute band under predetermined criteria to determine whether there is an existing or future travel course conflict, and an indication is produced in the event such a conflict is determined.

1 Claim, 3 Drawing Figures

Figure 3:
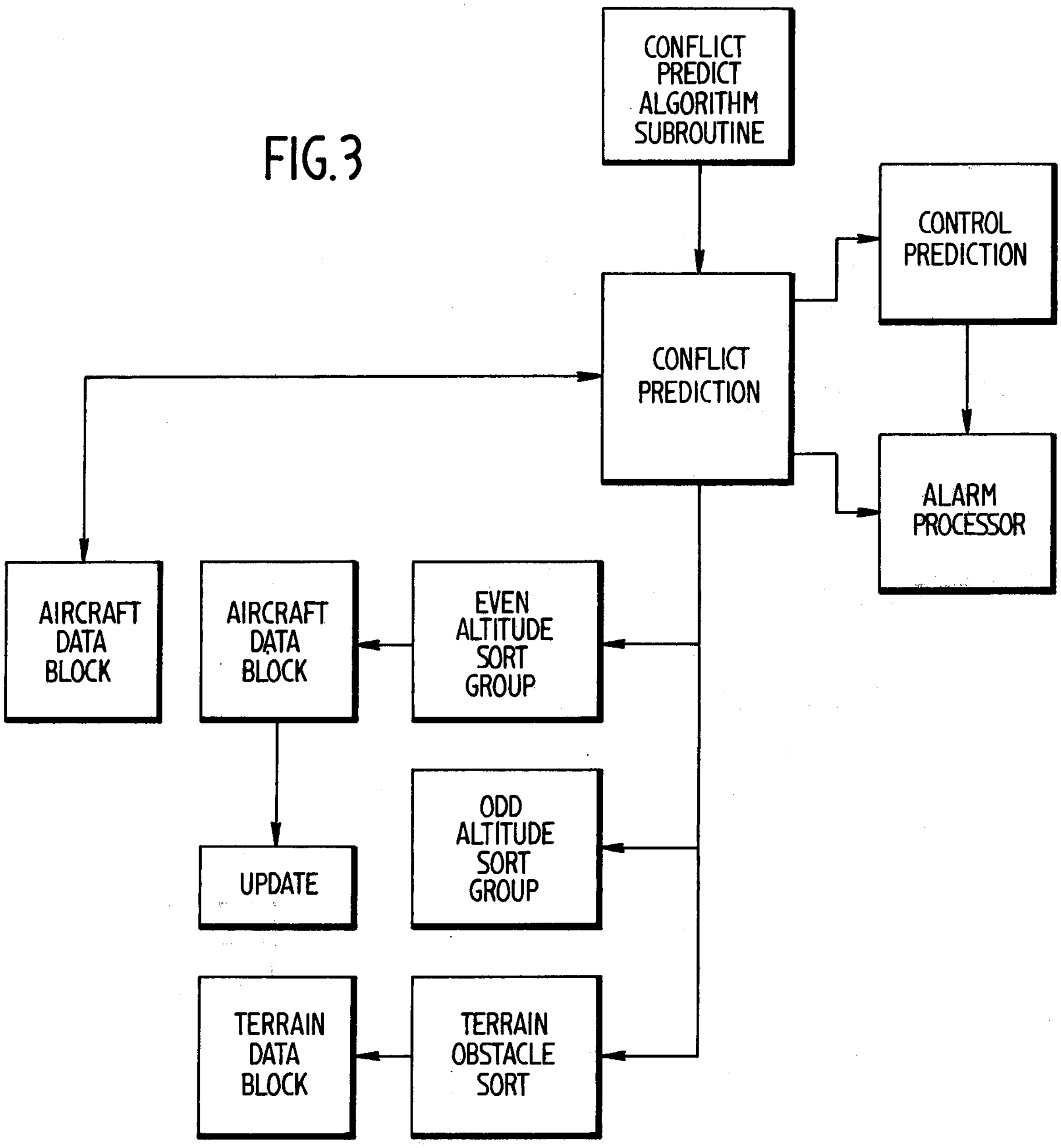

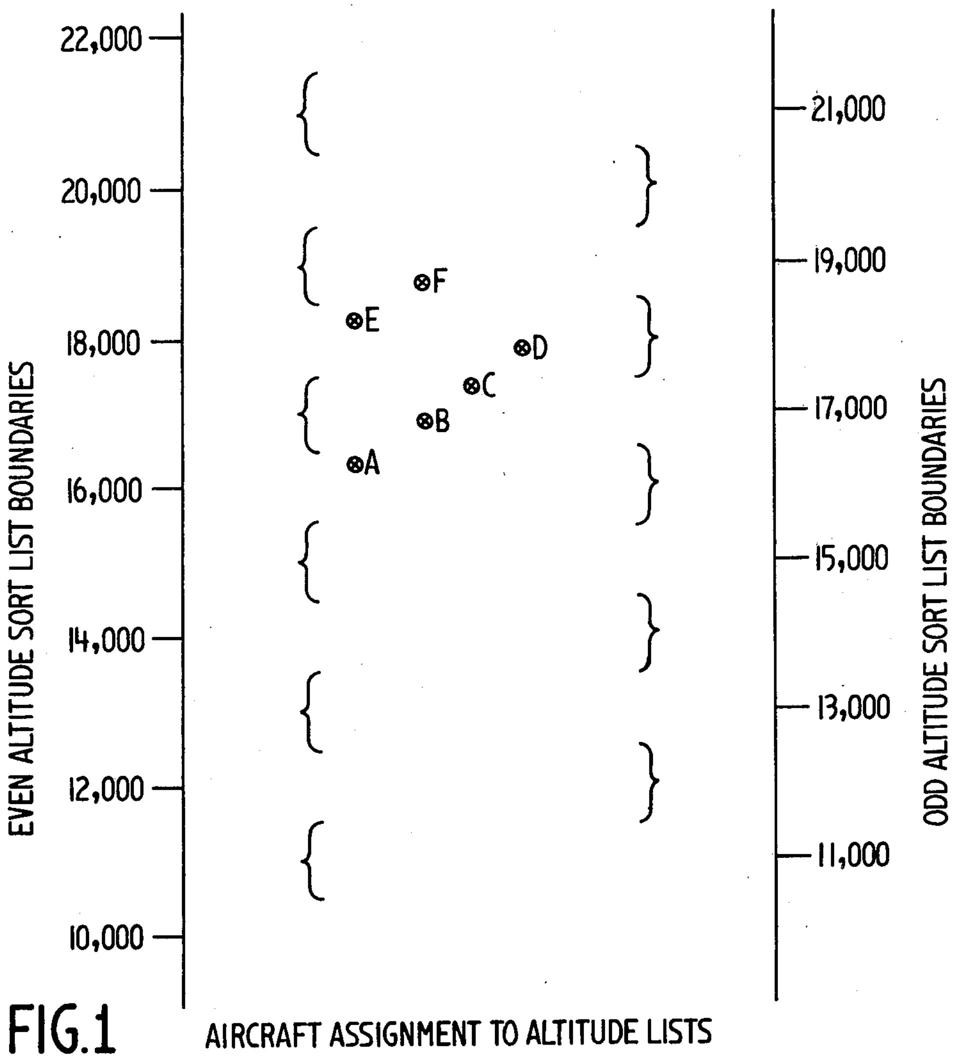
FIG.1 AIRCRAFT ASSIGNMENT TO ALTITUDE LISTS
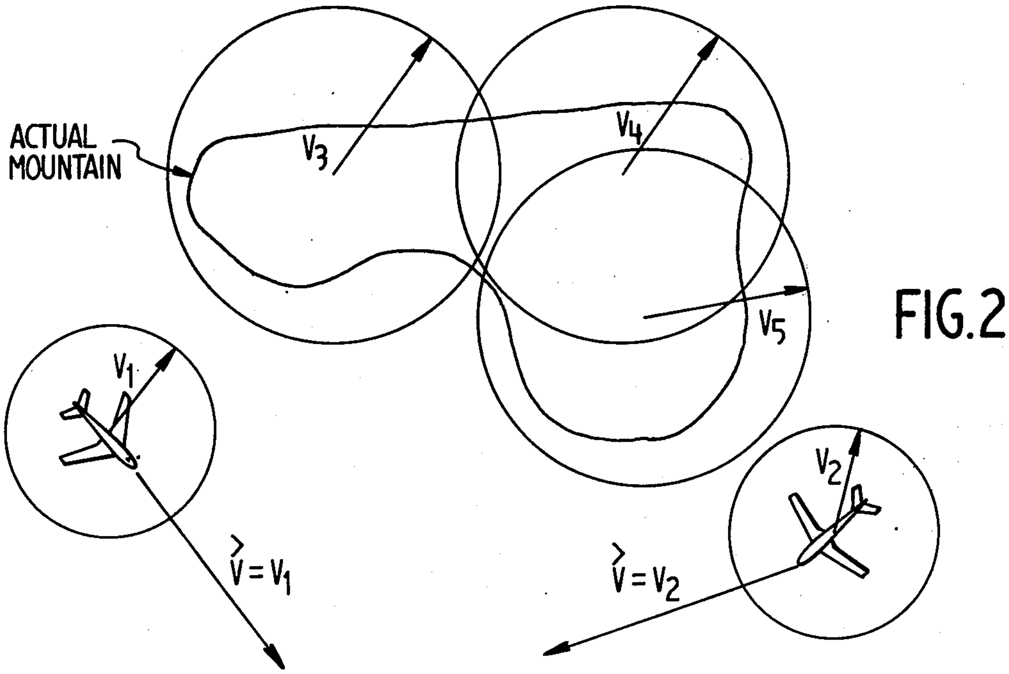
FIG.2

COMPUTER SYSTEM TO PREVENT COLLISION BETWEEN MOVING OBJECTS SUCH AS AIRCRAFT MOVING FROM ONE SECTOR TO ANOTHER

BACKGROUND OF THE INVENTION

1. Field of the Invention

The invention relates to the prevention of collisions between different aircraft, or aircraft and terrain, in an overall computer controlled system.

2. Detailed Description of the Invention

Flight Rules dictate that the pilot must fly at an odd thousand foot level up to Flight Level 240 and every other odd thousand foot level higher than FL240 when flying a magnetic bearing of 0 to 179. Even thousand foot levels are used for bearing of 180 to 359. This means that aircraft flying along an airway are separated from other aircraft flying in the opposite direction by 1000 ft. at altitudes below FL240 and by 2000 ft. above FL240.

In one aspect of the invention, flight conflict between different aircraft and between an aircraft and terrain within the same altitude bands is predicted.

Assuming that an aircraft is within its assigned band and flying at a constant altitude, it should be necessary to only search within its altitude band for other aircraft that may be in flight conflict. In reality, an aircraft may be flying close to the upper limit of altitude band 1 and be in potential conflict with an aircraft flying at the lower limit of altitude band 2. To resolve this ambibuity, aircraft may be divided into two groups according to altitude, see FIG. 1. The Even Altitude group contains 2000 ft. altitude bands separated on even thousand foot altitude boundaries and the Odd Altitude group contains 2000 ft. altitude bands separated on odd thousand foot altitude boundaries. As an example, aircraft A and B are assigned to Even Altitude Group 16K to 18K and Odd Altitude group 15K to 17K. Aircraft C and D are assigned to Even Altitude group 16K to 18K and Odd Altitude Group 17K to 19K. As each aircraft is made available for conflict analysis, its actual altitude defines which Even/Odd Altitude group and altitude band limits are to be used to get the other aircraft for conflict comparison. Thus, for example, aircraft B (FIG. 1) lies between 16,500 and 17,500 ft. altitude and causes a selection of the 16000–18,000 altitude band of the Even Altitude group and is compared with aircraft A, C, and D. Aircraft D is compared with aircraft C, E, and F.

Each aircraft is surrounded by an uncertainty area of airspace, which will be defined as a "puck". The puck is defined by a radius R and a height H with the aircraft located at the center. The puck moves with the aircraft and has the same velocity vector as the aircraft.

The radius of the puck (R) depends upon several factors. First, the aircraft can perturbate around an average flight path. This can be caused by low damped phugoid instability modes in the aircraft or by pilot inattention. Second, some aircraft have higher control response rates, i.e., can change their direction more rapidly. Third, the cruise speed is a factor: the faster the aircraft, the larger the amount of airspace that can be entered in a given time span.

The height of the puck (H) depends also upon several uncertainty factors. First, inaccuracies within the altimeter or pilot plumbing systems will lead to altimeter reporting errors. Second, the altimeter vernier which relate barometric pressure to true altitude may not be accurately set to the true increase of mercury below FL240 or at 29.92 above FL240. Third, digital alimeters report only to the nearest 100 feet and so mav have a reporting error of ±50 feet. Therefore each aircraft, although it is capable of reporting accuracies to within 1 foot, in reality lies within an inaccuracy band of around 200 feet.

Until the response of the system dictates otherwise, the puck radius (R) will be an assigned value based upon aircraft cruise speed. The puck height (H) will be an assigned value designed to give maximum degree of protection with a minimum of false conflicts with adjacent altitude bands. The values assigned to each aircraft puck however may be changed or reset. The Ground plane, mountains, obstacles and other obstructions are all represented by stationary pucks with the appropriate radius, height, and puck center altitude necessary to define the ground object.

A conflict prediction algorithm is programmed into a digital computer to compare two pucks and determines two levels of conflict. First there is immediate conflict where the boundary of one puck intersects with or otherwise violates the boundary of the other puck at this instant of time. Second, there is future conflict where although one puck does not touch the other, they are travelling so that they will intersect at some future time. If intersect does occur, the algorithm obtains the minimum separation distance between the centers of the pucks and the delta time to minimum distance. The algorithm calculation makes no judgment as to whether or not a conflict is an alarm condition. It passes back the conflict information to the Conflict Prediction task and there it is matched with the conflict criteria.

The essential points of this method are:

a. Uses linear programming techniques, requiring no recursive iterations.
b. All objects are modelized as three dimensional cylinders having a vertical axis.
c. There is NO distinction between aircraft and terrain (mountains, etc.). A mountain is thought of as a large airplane with zero velocity.
d. To first order, all equations are linearly independent in $z$. This reduces the geometry to two spatial dimensions, $(x, y)$ and one time dimension.
e. Algorithm gives conflict indication, distance of closest approach, and time-before-collision.

In general, all objects (aircraft, mountain, etc.) can be described by the following attributes:

$(X, Y, Z)$ = coordinates of center of cylinder
$r$ = radius of cylinder
$h$ = height of cylinder Assume first of all that the conflict problem is linearly separable in Z, thereby reducing the problem to $N_z$ separate two dimensional problems. If the maximum altitude is 40,000 ft., and $h$ is 1,000 ft., then $N_z = 40{,}000/1{,}000 = 40$. We therefore have up to 40 sets of dimensional problems. The following concerns only the two dimensional nature of the problem.

From the preceding discussion, the conflict problem reduces to predicting the collision of "moving circles" having various radii and velocities. For example, two planes circling a mountain are shown in FIG. 2.

Each circle is described by;

(X, Y) = coordinates of center
$\underset{\sim}{V}$ = radius
$\vec{V}$ = velocity vector Normally, if we have N objects, the system can be described by $$Fi\,(x,y,t) = 0 \quad i = 1, N \qquad (1)$$

where $Fi(x,y,t) = 0$ is the equation of the center of the object through space-time.

The distance between objects is $$Dij = [(Xi - Xj)^2 + (Yi - Yj)^2]^{\frac{1}{2}} \qquad (2)$$

represented by a N × N matrix. We evaluate this by transforming equation (1) into the form $$Xi = Gi(t) = X^o i + V^x i\, t \qquad (3)$$

$$Yi = Hi(t) \quad i = 1, N$$

and therefore $$D_{ij} = [(Gi(t) - Gj(t))^2 + (Hi(t) - Hj(t))^2]^{1/2} \qquad (4)$$

Now, we can compute the distance of closest approach (Dij) by differentiating the above with respect to time, and equating to zero, i.e., $$(5)$$

$$\frac{d}{dt}(Dij(t)) = 0 \Rightarrow \underset{Dij}{Min}$$

$$\frac{1}{2}[(Gi(t) - Gj(t))^2 + (Hi(t) - Hj(t))^2]$$

$$\times [2(Gi(t) - Gj(t))\left(\frac{dGi(t)}{dt} - \frac{dGj(t)}{dt}\right) +$$

$$2(Hi(t) - Hj(t))\left(\frac{dHi(t)}{dt} - \frac{dHj(t)}{dt}\right)] = 0.$$

Solving the above for $T^{min}$, and substituting into equation (4) gives $Dij^{min}$, the distance of closest approach.

Now, if $Dij^{min} \leqq V_i + V_j$ we have a conflict imminent in $t^{min}$ minutes.

Specifically, for constant velocities, and straight lines, $$X_i(t) = X_i + V_i^x t$$

$$Y_i(t) = Y_i + V_i^Y t$$

$$\Delta X_{ij} = X_i(t) - X_j(t) = X_{ij}^o + V_{ij}^x t$$

Where $V_i^x j = V_{ij}^x = V_i^x V_j^x$ $$Dij = \sqrt{(\Delta Xij)^2 + (\Delta Yij)^2}$$

Rearranging these equations, (a) $\Delta X_{ij}' + \Delta Y_{ij}' \dfrac{\Delta V_{ij}^Y}{\Delta V_{ij}^x} + 0t' + 0 = 0$ (b) $\Delta X_{ij}' + 0 - \Delta V_{ij}^x t' - \Delta X_{ij}^o = 0$ (c) $0 + \Delta Y_{ij}' - \Delta V_{ij}^Y t' - \Delta Y_{ij}^o = 0$ Solving for $t'$, (b) $t' = \dfrac{1}{\Delta V_{ij}^x}(\Delta X_{ij}' - \Delta X_{ij}^o)$ $$= \frac{1}{\Delta V_{ij}^x}\left(-\Delta Y_{ij}' \frac{\Delta V_{ij}^Y}{\Delta V_{ij}^x} - \Delta X_{ij}^o\right) \text{ (using (a)}$$

$$t' = \frac{-1}{\Delta V_{ij}^x}\left[(\Delta Y_{ij}^o + \Delta V_{ij}^Y t')\frac{\Delta V_{ij}^Y}{\Delta V_{ij}^x} - \Delta X_{ij}^o\right]$$

$$t' = \frac{\Delta V_{ij}^Y}{\Delta V_{ij}^x}\,\frac{\Delta V_{ij}^Y}{\Delta V_{ij}^X}\,t' - \frac{1}{\Delta V_{ij}^x}\Delta Y_{ij}^o \frac{\Delta V_{ij}^Y}{\Delta V_{ij}^x} - X_{ij}^o$$

$$t'\left[1 + \left(\frac{\Delta V_{ij}^Y}{\Delta V_{ij}^x}\right)^2\right] = -\left[\frac{\Delta Y_{ij}^o \frac{\Delta V_{ij}^Y}{2}}{(\Delta V_{ij}^x)} - \frac{\Delta X_{ij}^o}{\Delta V_{ij}^x}\right]$$

$$t' = \frac{(\Delta X_{ij}^o - \frac{V_{ij}^Y}{V_{ij}^x}\Delta Y_{ij}^o)}{\Delta V_{ij}^x\left(1 - \frac{(\Delta V_{ij}^Y)^2)}{\Delta V_{ij}^x}\right.}$$

$$\boxed{t' = \frac{\Delta X_{ij}^o - \frac{\Delta V_{ij}^Y}{\Delta V_{ij}^x}\Delta Y_{ij}^o}{\Delta V_{ij}^x - \frac{\Delta V_{ij}^Y}{\Delta V_{ij}^x}\Delta V_{ij}^Y}}$$

=time before collision (Substitute into $D_{ij}(t)$ for $D_{ij}^{min}$)

$$\frac{\partial D_{ij}}{\partial t} = \frac{\Delta X_{ij}\frac{\partial \Delta X_{ij}}{\partial t} + \Delta Y_{ij}\frac{\partial \Delta X_{ij}}{\partial t}}{\sqrt{(\Delta X_{ij})^2 + (\Delta Y_{ij})^2}}$$

$$\frac{\partial \Delta X_{ij}}{\partial t} = \Delta V_{ij}^X; \quad \frac{\partial \Delta X_{ij}}{\partial t} = \Delta V_{ij}^Y$$

Therefore $$\frac{\partial D_{ij}}{\partial t} = \frac{\Delta X_{ij}\Delta V_{ij}^x + \Delta Y_{ij}\Delta V_{ij}^Y}{\sqrt{(\Delta X_{ij})^2 + (\Delta Y_{ij})^2}}$$

To compute $D_{ij}^{min}$; Set $\dfrac{\partial D_{ij}}{\partial t} = 0$,

Solve for $t$ $$\frac{\partial D_{ij}}{\partial t} = 0; \quad \Delta X_{ij}'\Delta V_{ij}^x = -\Delta Y_{ij}'\Delta V_{ij}Y$$

Where $\Delta X_{ij} = \Delta X$ when $D$ is minimal.

Therefore $$\Delta X_{ij}'/\Delta Y_{ij}' = -\Delta V_{ij}Y/\Delta V_{ij}^x$$

$$\Delta X_{ij}' = \Delta X_{ij}^o + \Delta V_{ij}^x t'$$

Where $t' = t$ when $D$ is minimal.

Therefore, we have $$\Delta X'_{ij} = -\Delta Y_{ij}'\frac{\Delta V_{ij}^Y}{\Delta V_{ij}^x} \qquad \text{(a)}$$

$$\Delta X_{ij}' = \Delta X_{ij}^o + \Delta V_{ij}^x t' \qquad \text{(b)}$$

$$\Delta Y_{ij}' = \Delta Y_{ij}^o + \Delta V_{ij}^Y t' \qquad \text{(c)}$$

Which is 3 equations with 3 unknowns ($\Delta X_{ij}', \Delta Y_{ij}', t'$)

Using the information above, we compute $D_{ij}^{min}$ $$D_{ij}^{min} = \sqrt{(\Delta X_{ij})^2 + (\Delta Y_{ij})^2}$$

$$D_{ij}^{min} = \sqrt{(\Delta X_{ij}^o + \Delta V_{ij}^x t')^2 + (\Delta Y_{ij}^o + \Delta V_{ij}^Y t')^2}$$

Substitution $t'$ into the above gives the minimum separation.

Now, a collision is imminent if $$D_{ij}^{min} \leqq R_i + R_j.$$

$R_i$ and $R_j$ represent the radii of the pucks assigned to respective aircraft whose closest distance of approach is being determined by the conflict prediction algorithm.

Programming of the conflict prediction algorithm into a digital computer permits comparison of two pucks.

The conflict prediction task flow chart is shown in FIG. 3. It checks the aircraft altitude, selects on Even/Odd Altitude group and searches the group for the desired altitude band. Each aircraft data block entry in the altitude band is compared one at a time with the current updated aircraft data block. The conflict predict algorithm subroutine performs the calculations. Altitude information received from the aircraft is based upon the standard pressure setting of 29.92 In MG. The aircraft altitude is converted to actual altitude by a linear equation conversion using the actual barometric pressure from the meterlogical data array for the X, Y sector position. The actual altitude is tested against ground maximum and minimum values. If ground interference is suggested, the current aircraft data block is compared with all the Terrain data block in that altitude range using the same conflict predict subroutine.

Comparisons which result in conflicts are either immediate or future conflicts. Future conflicts occur N minutes in the future and any future conflicts occurring greater than M minutes in the future are ignored. M is specified within the system but may be changed or reset by operator input.

Future conflicts occurring in less than M minutes produce a warning alarm call to an Alarm Processing task (explained hereinafter) with the parameters of the alarm. Immediate conflicts showing actual puck violation produce an emergency alarm call to the Alarm Processing task. When all conflict comparisons are made and all alarm calls processed, the conflict prediction task calls the control prediction task and passes the address of the current updated aircraft data block. The controller may then use this information, or it may be automatically processed by a computer to prevent collisions.

The control prediction task performs two major functions. First it compares the new aircraft position with the anticipated flight plan boundries. Second, if a control fix is assigned, it will monitor the aircraft toward intercept with that control fix.

Each aircraft is continually executing a predefined flight plan. The aircraft is assigned to a single altitude or a block of altitudes. A single altitude assignment has an altitude tolerance band associated with it. The present band for example may be ± 400 ft. above FL180. The altitude assignment gives an upper and lower altitude limit. The current aircraft altitude is compared to the assigned altitude limits, and an out-of-limit condition generates a call to the alarm processor associated with control prediction, with alarm parameters defining the alarm condition.

The aircraft puck is assigned a radius value equal to 1N the total distance between the aircraft and its control fix. The control fix puck is assigned to the same altitude as the aircraft, has no effective height and also has a radius equal to 1/N the separation distance. Executing the conflict prediction algorithm subroutine on these two pucks provides intercept data to the fix. A future conflict indication shows that the aircraft is on a relative course no greater than ± Arc Sin Z/N degrees. As N gets larger the allowed deviation from the track decreases. The alarm processor converts the system alarm indications discovered by the conflict prediction and control prediction tasks into a usable form such as a visual display.

I claim:

1. A method of preventing collisions between aircraft moving in an aircraft control sector comprising:

continuously generating signals in each aircraft moving within the aircraft control sector which represent the instantaneous velocity and altitude of each aircraft, establishing a communication link between each aircraft moving within the control sector and a ground station for providing the ground station with the signals representative of the instantaneous velocity and altitude of each aircraft moving within the aircraft control sector, defining an imaginary airspace around the center of each aircraft, the airspaces having a given radius (R) and height (H), and moving with and at the same velocity as the aircraft, defining an imaginary airspace having zero velocity around selected objects of terrain located within the aircraft control sector, updating the parameters of each defined airspace as the corresponding aircraft travels by analysis of the instantaneous velocity and altitude of each aircraft moving within the control sector which has been relayed to the ground station by the communication link between the aircraft and the ground station, comparing the parameter of each aircraft defined airspace one at a time with the parameter of all other defined airspaces within a discreet altitude band to determine whether there is an existing or future course conflict under predetermined criteria, producing an indication in the event such conflict is determined, and communicating with any aircraft moving within the control sector on which an indication of conflict has been determined.

* * * * *